May 31, 1927.
J. J. R. GUICHARD
1,630,939
EDUCATIONAL APPLIANCE
Original Filed July 29, 1925   2 Sheets-Sheet 1
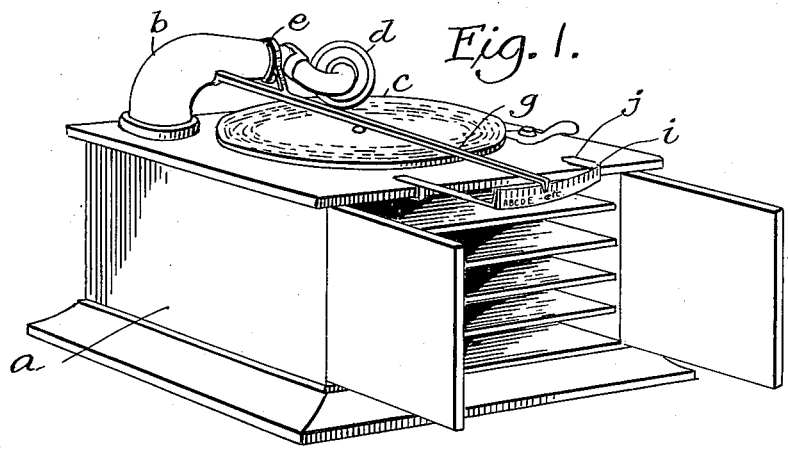
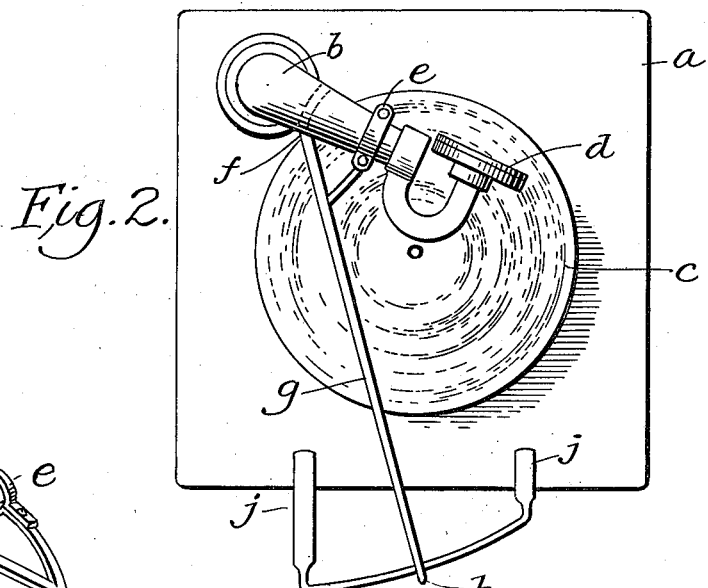
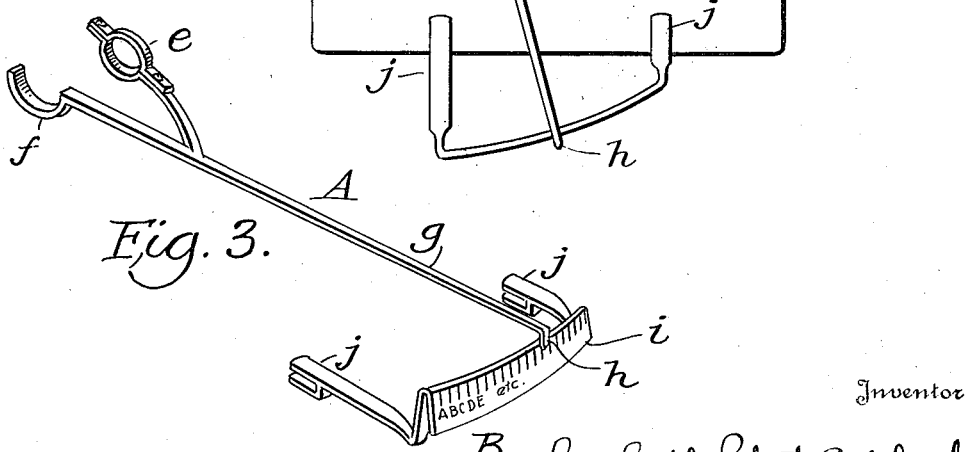
Inventor
Jean Joseph Robert Guichard
By Alexander Dowell
Attorneys

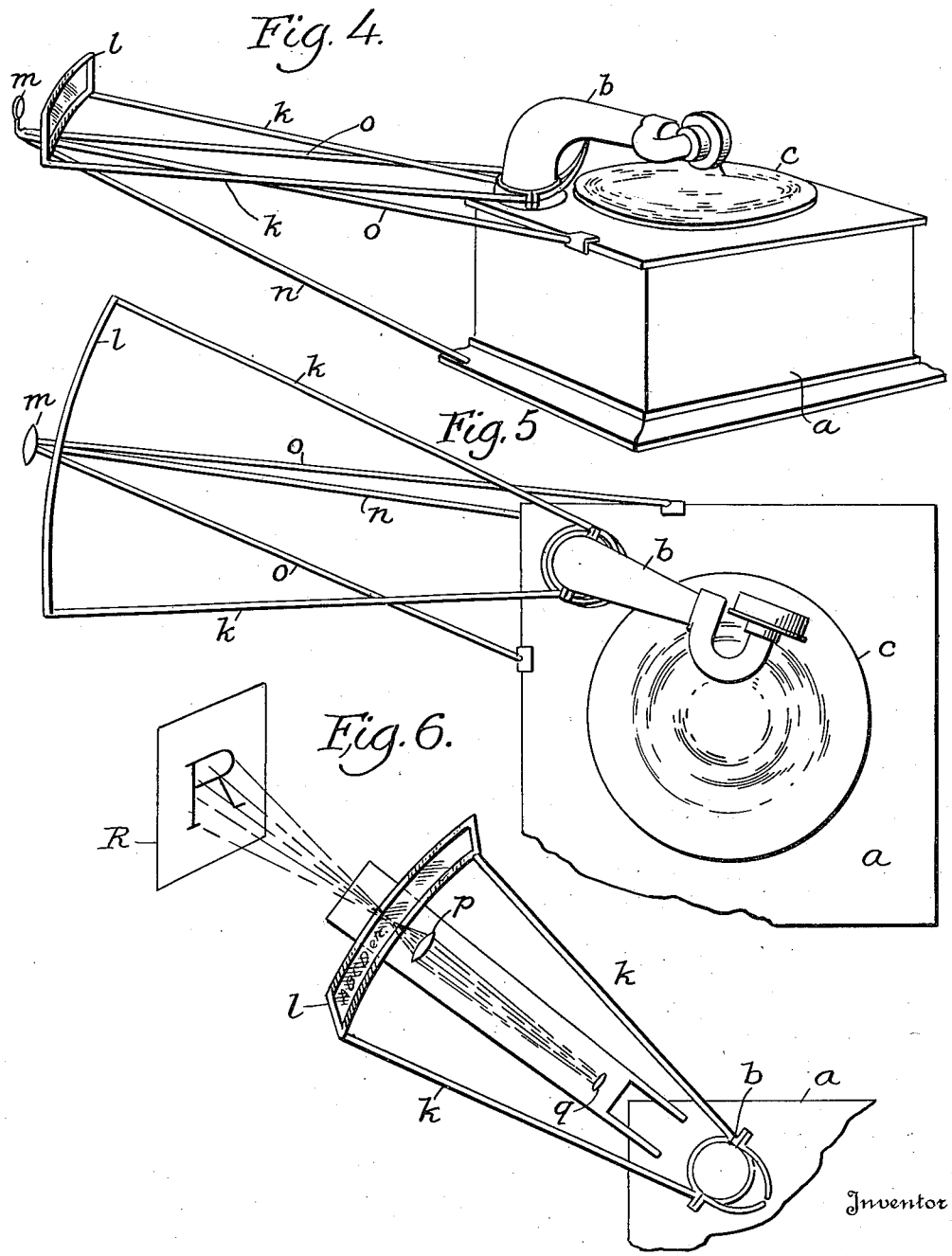

Patented May 31, 1927.

1,630,939

UNITED STATES PATENT OFFICE.

JEAN JOSEPH ROBERT GUICHARD, OF BUENOS AIRES, ARGENTINA.

EDUCATIONAL APPLIANCE.

Application filed July 29, 1925, Serial No. 46,875, and in Argentina April 24, 1925. Renewed April 16, 1927.

This descriptive specification refers to a device for phonographs and other talking machines, to adapt them to the teaching of the signs of the Morse alphabet, eliminating the need for the operator to have any teacher, as under my system, the instruction is so simplified that a person can receive simultaneously both the auditory and visual representation of the sound emitted by the phonograph, or the graphic representation of the characters or signs, which are displayed by means of an indicator, working in combination with the acoustic arm or diaphragm of the phonograph. This permits the pupil to take the lesson by himself alone, thus realizing his instruction with greater independence and in less time than is required by the other methods and systems hitherto known.

The essence of my invention consists in the novel application to phonographs and talking machines in general, of indicators that will allow the simultaneous graphic representation, in characters, or signs, of the sounds emitted by the phonograph or gramophone, the disc or cylinder of which in reproducing the sounds of the telegraphic or radio-telegraphic impression, coincides with the revolution of the needle of the acoustic diaphragm, and at the same time with indicators which, by any adequate means, reproduce graphically and simultaneously the characters of the signs of the Morse alphabet corresponding to the impressions of the phonograph discs or cylinders which it is desired to reproduce, my invention being adapted to be used to give lessons in the Morse alphabet, or for the teaching of the same, either in special classes or individually.

The accompanying drawing clearly illustrates my invention, in which drawing:—

Fig. 1 is a perspective view of a phonograph with my invention applied thereto, showing in full lines a simple form of indicator, and in dotted lines, a modified form of indicator.

Fig. 2 is a top plan view thereof.

Fig. 3 is an enlarged perspective view of the indicator arm and scale bar, detached.

Fig. 4 is a perspective view of a phonograph showing a modified form of indicator applied thereto.

Fig. 5 is a top plan view of Fig. 4.

Fig. 6 is a partial plan view of a still further modified form.

In Figs. 1 and 2 the usual type of phonograph is illustrated to which one form of my invention is applied, which form, as illustrated in Fig. 3, comprises the indicator arm $g$ and the scale bar $i$ which is placed at the front side of the phonograph; it also has a modified application shown in dotted lines at the back, in which the indicator is stationary, and the scale bar $i$ is movable, the same being attached to the acoustic arm $b$ by means of the supports $k$, the indicator arm $n$—$o$ remaining fixed, and a magnifying lens $m$ being attached to the end of this arm in order to augment the characters, thus rendering their reading more easy.

In Fig. 3 the complete indicator arm is marked with the letter "A"; it being formed of a straight part $g$ terminating in an undulating form at one end $f$, establishing its security on the acoustic arm (as shown in Figs. 1 and 2), the opposite end $h$ terminating in the form of an indicator needle, which moves over the indicator dial. "B" indicates the complete scale bar $i$—$j$, showing the simplicity of its working parts and construction.

In operation, when scale bar $i$ by means of clamps $j$ has been placed on phonograph $a$, and the indicator arm $g$ has been placed on the sound arm $b$ and secured by means of clamps $e$ and undulation $f$, then record disc $c$ is placed on the revolving plate of the phonograph, and as it revolves beneath the needle of the phonograph, causes the acoustic arm $b$ to swing in an arc, and this in its turn causes needle $h$ to swing in another concentric arc of a circle, passing close to the indicator scale bar $i$, in such a way that if the needle passes over a part of the disc impressed with the reproduction of a certain letter or sign, (for example, "—"), the indicator needle $h$ will point to the letter "A" on scale bar $i$, and so on in succession the other signs or letters will be shown, and such letters or signs will be reproduced both auditorily and graphically at the same time.

In Figs. 4 and 5, a modification of the indicator illustrated diagrammatically in Figs. 1 and 2, is shown, in which the indicator arm is stationary or fixed to the phonograph casing $a$ by means of two horizontally disposed braces $o$ and a diagonal brace $n$ meeting at a point beyond the end of said casing and being connected at such point in any desired manner. A magnifying glass $m$ is secured in vertical position at the ends of braces $o$, and $n$. The arcuate scale bar $l$ is movable with the sound arm $b$ of the phonograph, the same being supported by two arms $k$ which are secured to the sound arm $b$ in any desired manner, to cause scale bar $l$ to move in an arc close to and opposite the magnifying glass $m$, scale bar $l$ showing the letters or signs, simultaneously, as the sounds are reproduced from the disc $c$ by the phonograph, magnifying glass $m$ serving to facilitate the reading of the scale bar $l$.

In Fig. 6, a still further modification is illustrated in which the scale bar $l$ supported by arms $k$ moves with the sound arm $b$ as described with respect to Figs. 4 and 5, the scale bar $l$ passing a fixed lens $p$ through which rays of light are directed from a light source $q$, thereby projecting an enlarged image of the reading of scale bar $l$ on a screen $r$.

Now when it is desired to reproduce the characters utilizing the arrangement indicated by the dotted lines in Figs. 1 and 2, and shown in more detail in Figs. 4-5-6, the only variation lies in the fact that the movements of both the scale bar and the indicator arm are reversed, $l$—$k$ being now mobile and $m$—$n$—$o$ fixed.

As shown and described, the arc traversed by the indicator over the scale bar is obviously proportioned to the arc traversed by the needle over the record $c$. Hence, if the indicator arm is twice the distance from the pivot point of the sound arm to the needle, then the travel of the indicator would be twice the travel of the needle. My invention allows direct and immediate reading of the letters or figures corresponding to the sounds emitted by the phonograph mechanically synchronated. Even if the needle is lifted and replaced on any other portion of the disc, the indicator will still correspond with the sound emitted from the phonograph. The attachment does not require any alteration to the phonograph. The indicator and scale bar lie entirely outside the phonograph casing allowing the movement of the scale bar to be made in proportion to any movement of the needle. The use of the magnifying glass and the movable dial allows the reading of the scale bar to be easily accomplished, and the use of the projecting lamp projects the scale bar reading on the screen.

I claim:—

1. In combination with a phonograph having a sound arm; a record having grooves for producing certain sounds, a movable member connected with the sound arm of the phonograph, and extending beyond the side of the phonograph casing, and adapted to swing in an arc as the sound arm is moved; a fixed member extending from the phonograph casing, and having its outer end extending adjacent the outer end of the movable member; one of said members carrying a scale bar, and the other carrying an indicator, the grooves in the record and the scale bar being so related that the indicator will point to the graphic representation of the sound emitted by the sound arm.

2. In a combination as set forth in claim 1; means for facilitating the reading of the scale bar by enlarging the readings of the scale bar.

3. In a combination as set forth in claim 1; a magnifying glass mounted on the end of the fixed member adjacent the scale bar.

4. In a combination as set forth in claim 1; the movable member carrying a transparent scale bar; a screen; and a lens and projecting lamp on the fixed member adjacent the scale bar, whereby the reading of the scale bar will be projected on the screen.

5. In combination with a phonograph having a sound arm; a record having grooves for producing certain sounds, a movable scale bar detachably attached to the sound arm of the phonograph, and extending beyond the side of the phonograph casing, and adapted to swing in an arc as the sound arm is moved; a fixed member detachably attached to and extending from the phonograph casing, and having an indicator at its outer end adjacent the scale bar; and means for facilitating the reading of the scale bar by enlarging the readings of the scale bar; the grooves in the record and the scale bar being so related that the indicator will point to the graphic representation of the sound emitted by the sound arm.

6. In a combination as set forth in claim 5; said means comprising a magnifying glass mounted on the end of the fixed member adjacent the indicator.

7. In a combination as set forth in claim 5; the scale bar being transparent; a screen; and a lens and projecting lamp mounted on the fixed member adjacent the scale bar, whereby the reading of the scale bar will be projected on the screen.

Signed at Buenos Aires, this 17th day of June, A. D. 1925.

JEAN JOSEPH ROBERT GUICHARD.